June 13, 1961 S. D. COCKBURN ET AL 2,987,907
INTEGRAL LATCH AND LATCH OPERATING ASSEMBLY
Filed Dec. 26, 1957 4 Sheets-Sheet 1
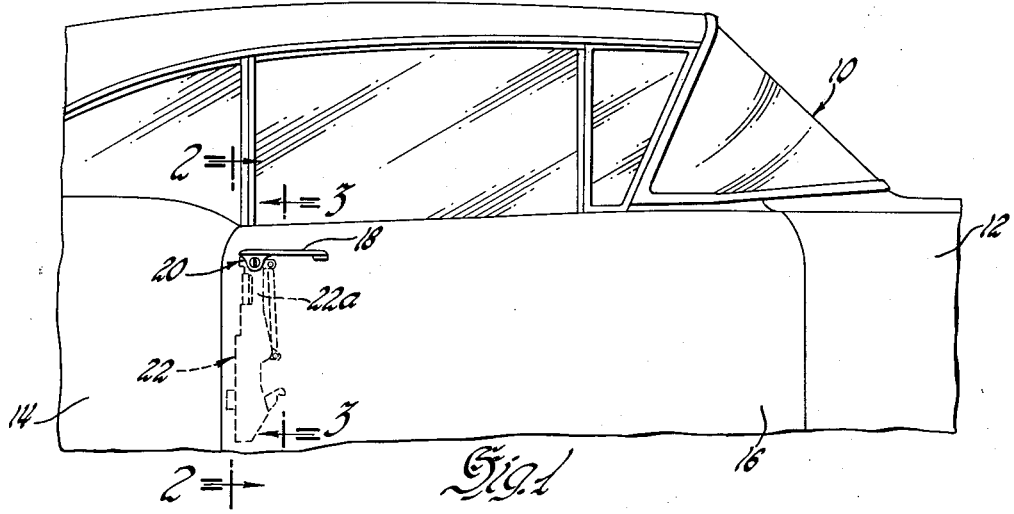
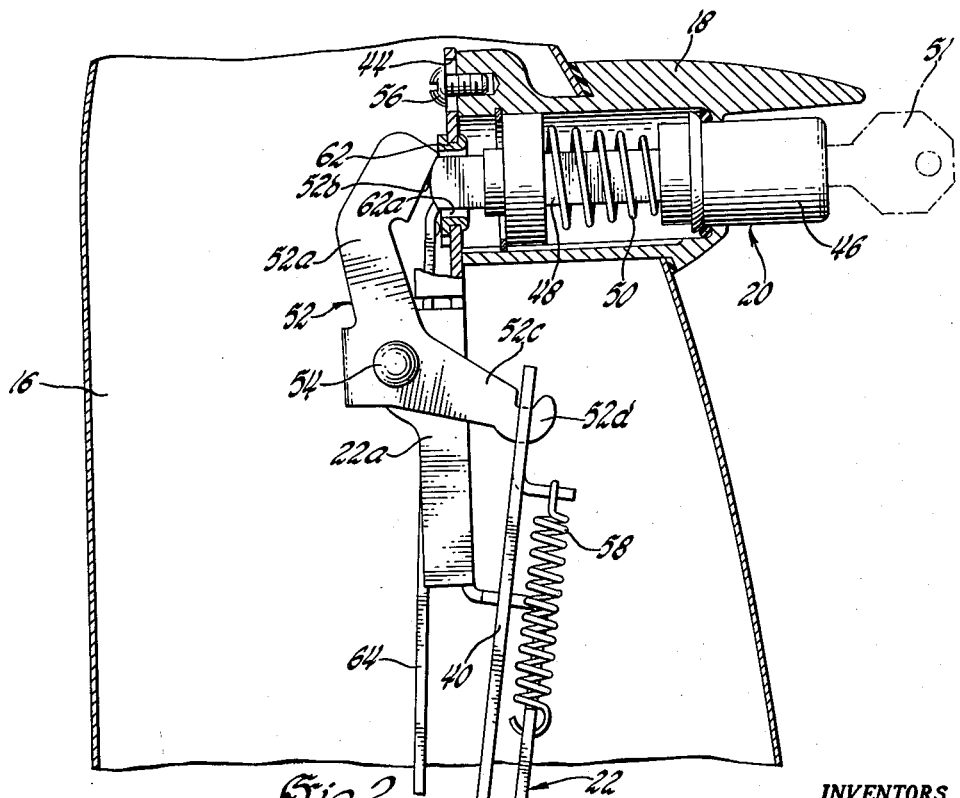
INVENTORS
Stanley D. Cockburn &
BY James D. Leslie
W. Pettigrew
ATTORNEY

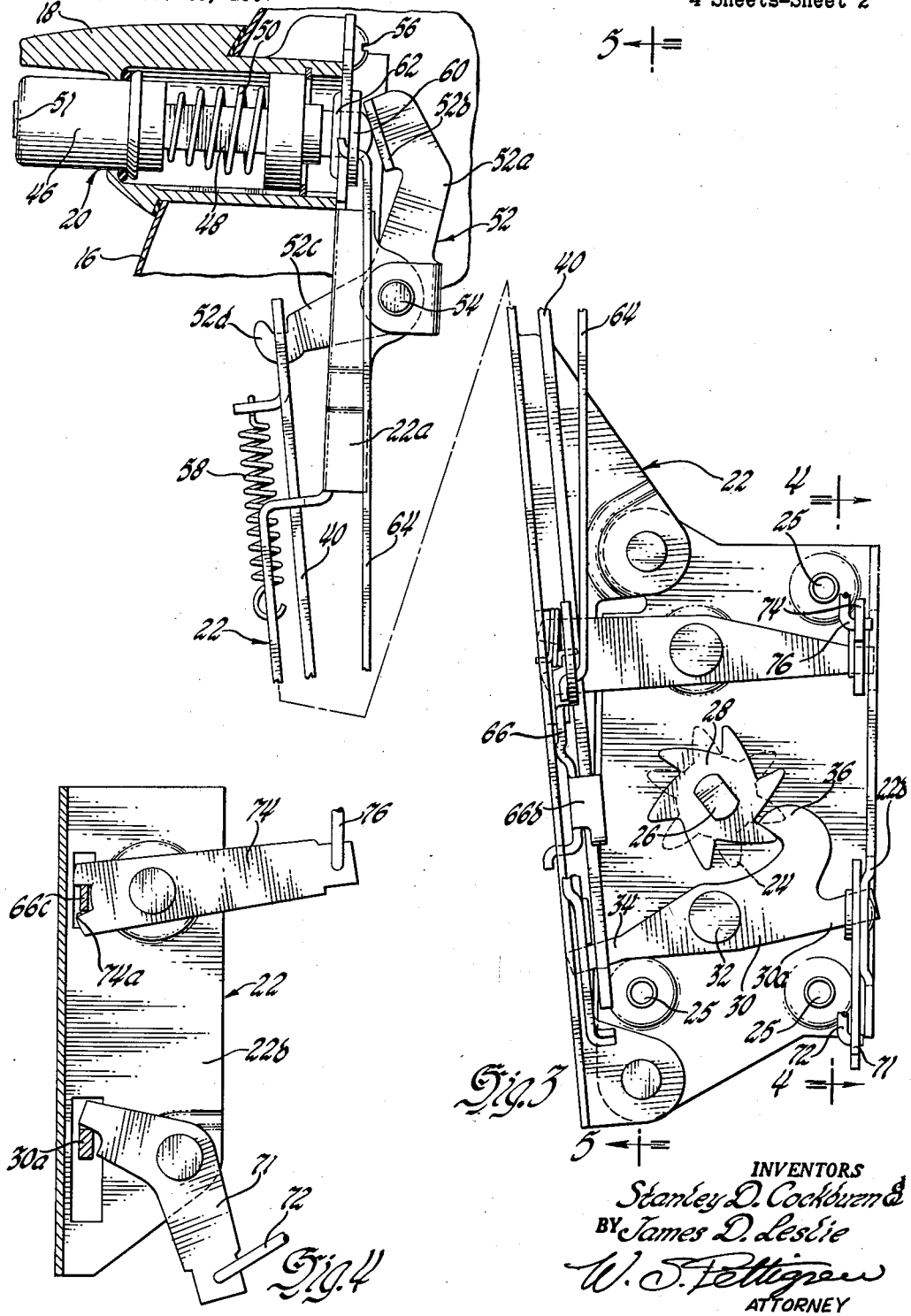

June 13, 1961  S. D. COCKBURN ET AL  2,987,907
INTEGRAL LATCH AND LATCH OPERATING ASSEMBLY
Filed Dec. 26, 1957  4 Sheets-Sheet 3
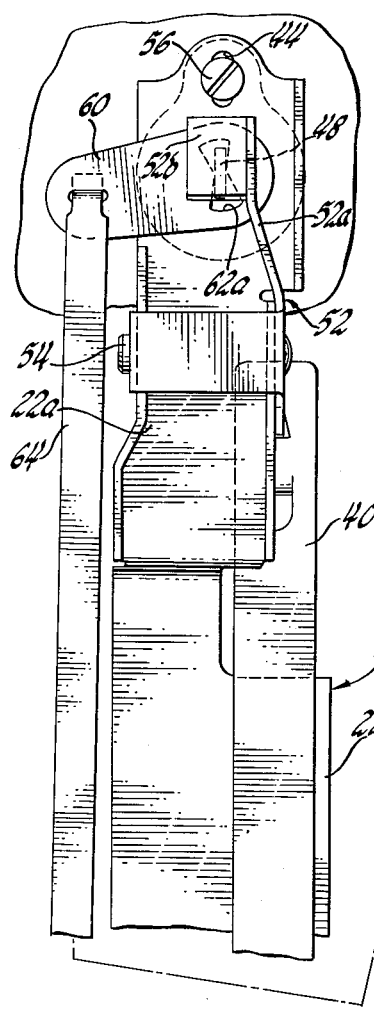
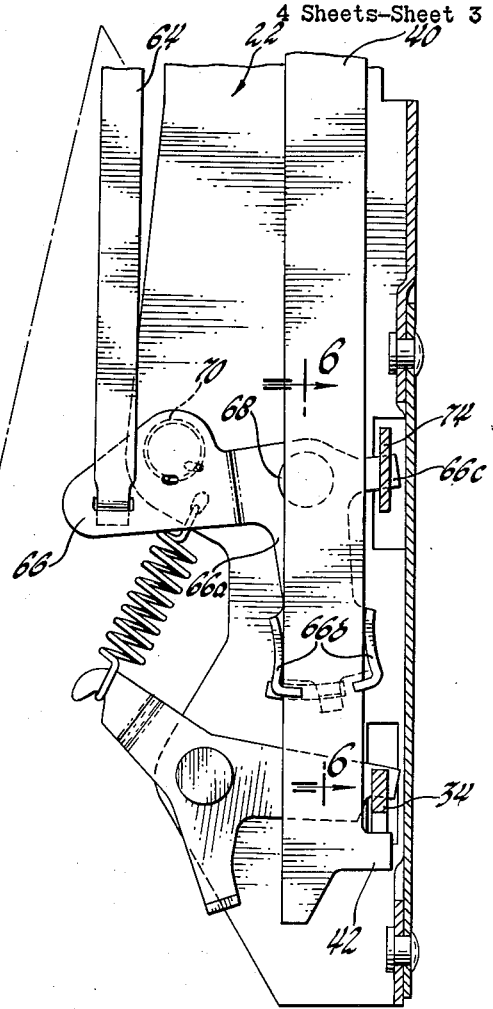
Fig. 5
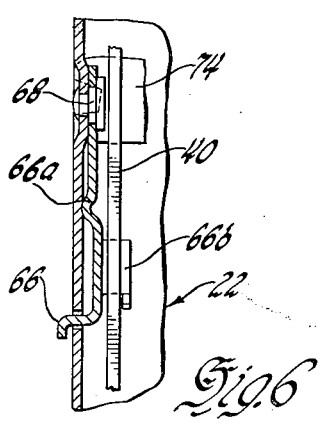
Fig. 6
INVENTORS
Stanley D. Cockburn &
BY James D. Leslie
W. S. Pettigrew
ATTORNEY

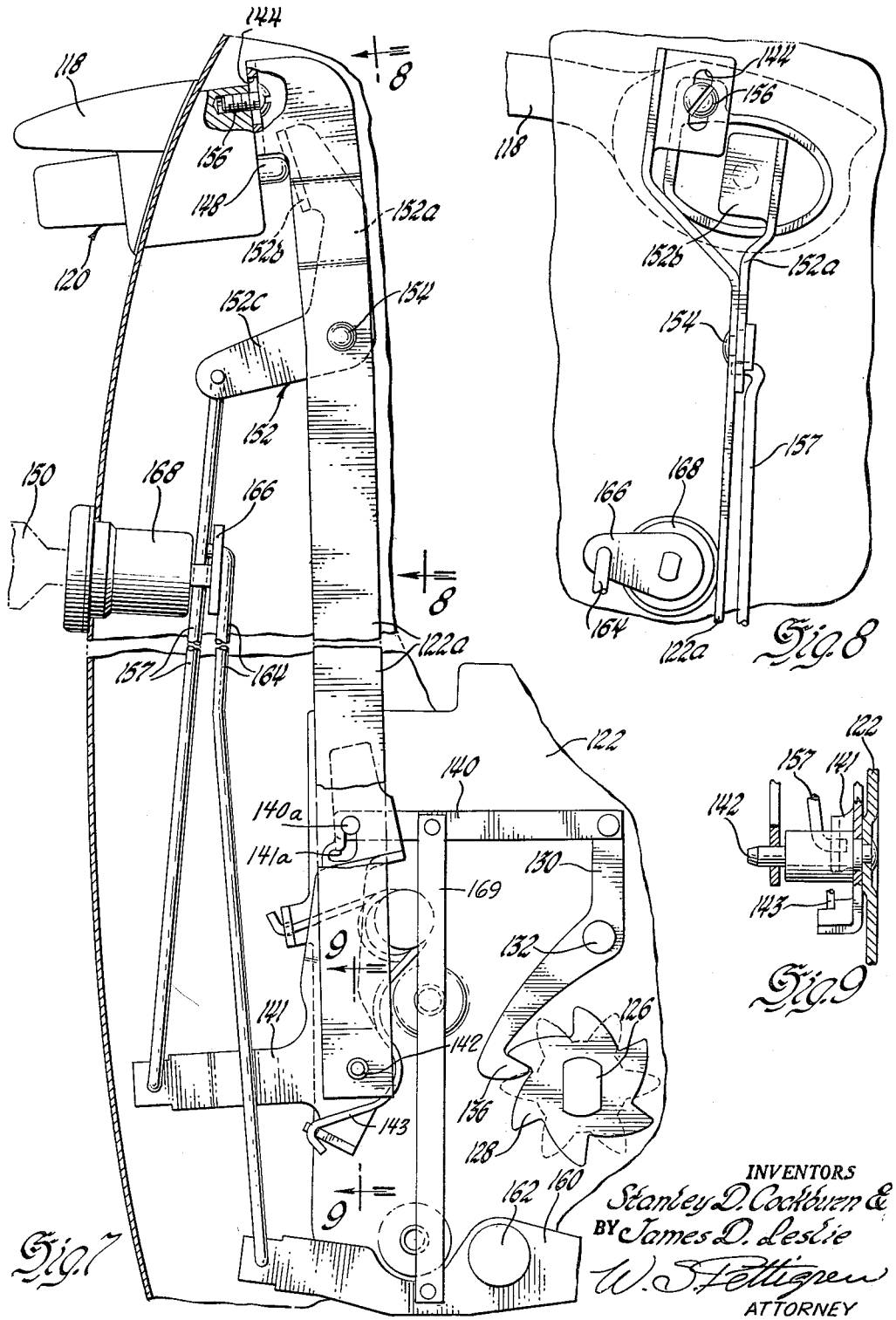

United States Patent Office 2,987,907
Patented June 13, 1961

2,987,907
INTEGRAL LATCH AND LATCH OPERATING ASSEMBLY
Stanley D. Cockburn, Warren, and James D. Leslie, Birmingham, Mich., assignors to General Motors Corporation, Detroit, Mich., a corporation of Delaware
Filed Dec. 26, 1957, Ser. No. 705,215
5 Claims. (Cl. 70—135)

This invention relates to an integral latch and latch operating assembly, and more particularly to an assembly of this type adapted for use in an automobile door.

One feature of the invention is that it provides an improved integral latch and latch operating assembly for an automobile door; another feature of the invention is that it provides an integral assembly in which the latch and its outside operating parts are all mounted on the latch frame, eliminating the necessity for adjusting the length of the rods which connect the outside handle and operating means with the door latch after the parts are assembled; a further feature of the invention is that it provides a construction in which an elongated frame carried in the door mounts the door latch, the outside handle push button assembly and key cylinder and the connecting means between the latch and the push button and key cylinder; a further feature of the invention is that the intermittent link which operates the latch detent extends from the detent to a location adjacent the handle mounting means, eliminating the necessity for a separate connecting rod; and yet a further feature of the invention is that certain adjustment measures normally required due to mass production tolerances are eliminated since all of the parts are mounted on a single frame.

Other features and advantages of the invention will be apparent from the following description and from the drawings, in which:

FIG. 1 is a fragmentary side elevational view of an automobile having the improved integral latch and operating assembly mounted therein;

FIG. 2 is an enlarged fragmentary vertical section through a portion of the automobile door taken along the line 2—2 of FIG. 1;

FIG. 3 is a vertical section taken along the line 3—3 of FIG. 1;

FIG. 4 is a detail section showing a portion of the latch taken along the line 4—4 of FIG. 3;

FIG. 5 is a section taken along the line 5—5 of FIG. 3;

FIG. 6 is a detail section taken along the line 6—6 of FIG. 5;

FIG. 7 is a section showing a modified form of the invention, parts being shown in diagrammatic form;

FIG. 8 is a section taken along the line 8—8 of FIG. 7; and

FIG. 9 is a detail section taken along the line 9—9 of FIG. 7.

In modern automobile body construction, it is often necessary to mount the door latch at a location spaced from the outside operating handle, this being particularly true in body styles in which the body center pillar terminates at the belt line. In automobile bodies of this type due to space limitations, it often happens that there is no room adjacent the belt line for mounting the front door keeper and consequently, the latch is mounted down below the belt line and is connected to the outside operating means by rods. In the front door, there is usually one rod connected between the push button assembly and the intermittent link which triggers the detent and another rod connected between the key cylinder and the locking lever in the latch. Due to normal mass production tolerances, it often happens that some adjustment is necessary after assembly to enable the connecting rods to fit properly between the parts. In conventional construction as described above, the latch is mounted on a frame carried in the door and the handle, push button and key cylinder are mounted on the door itself so that the distance between the push button assembly and the latch and the distance between the key cylinder and the latch may vary due to normal production tolerances.

This invention provides an improved construction wherein a single frame carried in the door mounts the latch, the handle including the push button assembly, the key cylinder and the connecting means between the latch and the other parts. The necessity for adjustment of the connecting means after assembly is avoided.

Referring now more particularly to the drawings, an automobile designated generally as 10 has a body including a front quarter 12 and a rear quarter 14. A door 16 is hingedly mounted at its front edge on the front quarter 12 in conventional manner (not shown). Adjacent its rear free swinging edge, the door mounts a latch for engagement with a conventional keeper (not shown) mounted on the rear quarter 14. The door 16 carries a latch later to be described which is operable from the outside through a fixed gripping handle 18 which carries a push button assembly designated generally as 20. Conventional inside operating means (not shown) may also be provided.

An elongated frame designated generally as 22 is mounted in the door, being secured to the jamb face thereof by bolts (not shown) passing through screw bosses 25 (see FIG. 3). While the particular type of latch forms no part of this invention, the latch illustrated includes a bolt 24 rotatably mounted on the frame 22 for latching engagement with a conventional keeper (not shown) which is mounted on the body rear quarter 14. The keeper and the manner in which it engages the bolt are fully described in the Leslie Patent 2,796,276, entitled "Rotary Bolt Door Latch."

The bolt is rigid on a rotatable stud 26 which, on the inside of the frame, rigidly carries a ratchet 28, the bolt stud and ratchet being rotatable as a unit. A detent 30 is pivoted on the frame at 32, the detent having an operating arm 34 extending in one direction from the pivot and an integral latching foot 36 extending in another direction and adapted to engage the ratchet 28 and hold the bolt and ratchet against rotation in one direction. As shown in FIG. 3, when the detent is in engagement with the ratchet, the latching means including the bolt and ratchet are held against rotation in a counterclockwise direction. Since the bolt engages complementary teeth on the striker, the door is held in latched position. If the detent foot 36 is swung away from the ratchet, the latching means is freely rotatable and the door may be opened.

Actuating means for moving the detent out of engagement with the latching means comprises an intermittent link 40 which extends upwardly from the location of the detent. The intermittent link is formed with an operating tab 42 (see FIG. 5) which underlies the detent arm 34 so that when the intermittent link is shifted upwardly, it picks up the detent and swings it clockwise in FIG. 3 out of engagement with the latching means. Means to be described later are provided for swinging the intermittent link out of coupled relation to the detent so that upon shifting movement, the intermittent link merely "free wheels" and the tab 42 does not pick up the detent. In this condition of operation, the door is locked.

The latch frame 22 has an upwardly extending portion 22a which, adjacent its top end, is arranged to mount the handle 18, the frame portion 22a being formed with an elongated screw receiving slot 44 as shown best in FIG. 2. The handle 18 carries the push button assembly 20 including a push button 46, a push rod 48 and a coil spring 50 for biasing the push button and push rod outwardly. In the embodiment of the invention shown in FIGS. 1 through 6, a conventional key cylinder is mounted in the push button for operation by a key 51. A bell crank lever 52 is pivotally mounted on a pin 54 on the frame extension 22a, the bell crank lever having an upwardly extending arm 52a formed at its end with a right angular flange 52b for coupling engagement with the push rod 48. A second downwardly depending arm 52c on the lever 52 terminates in a hook 52d which is connected to the upper end of the intermittent link 40, the intermittent link extending all the way from the detent to a location adjacent the handle mounting means.

Conventional assembly of the automobile may be simplified according to this invention by forming a subassembly of the latch on its frame and the bell crank 52 with the intermittent link connected between the bell crank and the latch. When the automobile body is assembled, the handle 18 is inserted from the outside of the door 16 and secured directly to the latch frame in the elongated opening 44 by a screw 56. There are no separate connecting parts between the handle and the latch which may require adjustment due to normal manufacturing tolerances. Since the slot 44 provided for connection of the handle to the frame is elongated, and since the push rod 48 may engage the flange 52b over a considerable distance, any production variations are automatically accounted for without the necessity for any separate adjusting means. A spring 58 connected between the frame and the intermittent link biases the intermittent link and the bell crank to their proper position. When the push button 46 is depressed, the bell crank 52 is swung to lift up on the intermittent link 40. This causes the pick-up tab 42 which normally underlies the arm 34 of the detent to pick up the detent and swing it out of engagement with the latching means.

Means also are provided for locking the door by swinging the intermittent link so that the arm 34 of the detent does not lie in the path of shifting movement of the intermittent link. A locking pawl 60, best shown in FIG. 5, is pivotally mounted on the frame for engagement with the push rod 48 so that when the key 50 is turned, the pawl 60 is swung about its pivotal axis. The pawl is formed with a bearing portion 62 shown in FIG. 2 having an opening 62a large enough to receive the end of the push rod 48 with clearance to permit normal production tolerance. Since the pawl is pivoted at a fixed location on the frame, it may be connected without special adjusting means to the locking parts in the door latch. A locking link 64 is connected at its top end to the pawl and at its bottom end to a locking lever 66 pivotally mounted at 68 on the latch frame. An over-center spring 70 yieldably holds the locking lever in locked or unlocked position. A downwardly extending arm 66a on the locking lever 66 is formed at its lower end with oppositely disposed wall flanges 66b which straddle the intermittent link 40 so that the intermittent link may be shifted in a clockwise direction as the parts appear in FIG. 5 to move its pick-up tab away from the arm 34 of the detent. In other words, when the key is turned to locked position, the locking pawl 60 is swung in a clockwise direction in FIG. 5 to pull up on the locking link 64 and swing the locking lever 66 clockwise. Now if the push button 46 is depressed, the intermittent link 40 will merely "free wheel," its pick-up tab 42 bypassing the detent arm. Since the locking parts comprising the pawl 60, the link 64 and the locking lever 66 all are carried by the frame 22, no adjustment means is necessary between the key cylinder and the locking lever. As pointed out earlier, the opening 62a in the pawl provides for tolerances in the location of the push rod 48.

FIGS. 3, 4 and 5 show how the unlatching and locking structure may be connected to a conventional inside door operating mechanism. The latch frame 22 is formed with a flange 22b which pivotally mounts a remote lever 71. One arm of this lever is connected by a conventional rod 72 to a conventional inside door handle (not shown). The other arm of this lever overlies an arm 30a of the detent. When the inside handle is operated to pull on the rod 72, the remote lever 71 swings counterclockwise (FIG. 4) to pivot the detent out of engagement with the latching means. The locking lever 66 has an extension 66c which is received in a notch 74a formed in an inside locking lever 74. This lever is connected by a rod 76 to a conventional garnish molding inside locking device.

FIGS. 7, 8 and 9 show partly in diagrammatic form, a modified form of the invention in which the key cylinder is mounted down below the push button assembly rather than being mounted inside the push button. In this modified form, there is a latching device including a ratchet 128 pivotally mounted on a stud 126 on the latch frame 122. The detent 130 is pivoted at 132 on the latch frame and has a latching foot 136 for engaging the ratchet 128 to hold the bolt against rotation in one direction. The detent is adapted to be operated by an intermittent link 140 which is movably and pivotally mounted by means of a pin 140a in an L-shaped slot 141a on one arm of the bell crank 141 which is pivoted at 142 on the latch frame. A spring 143 biases the bell crank 141 to the position shown. The frame is provided with an extension 122a which projects upwardly to a location adjacent the mounting means for a handle 118 which carries a slidable push button assembly 120 including a push rod 148. Adjacent the top end of the frame there is an elongated slot 144 for receiving a handle mounting screw 156. The bell crank 141 is connected by a rod 157 to a bell crank designated generally as 152 pivotally mounted at 154 on the frame extension 122a. An upwardly extending arm 152a of the bell crank 152 is formed with a flange 152b adapted to abut the push rod 148. The other arm 152c of the bell crank 152 is connected to the upper end of the rod 157. When the push button is depressed, the rod 157 is moved upwardly, swinging the bell crank 141 in a clockwise direction and shifting the intermittent link 140 to move the detent foot out of engagement with the ratchet. A conventional type of uncoupling means may be provided in the latch for locking the door. This uncoupling means operates from the outside through a rock lever 160 pivoted at 162 on the latch frame and connected by a rod 164 to a locking pawl 166 carried on a key cylinder device 168. As shown in FIG. 7, this key cylinder device is mounted on the outer panel of the door. A link 169 connects the rock lever 160 to the link 140, so that turning the key 150 moves the rod 164 downwardly to rock the lever 160 and move the pin 140a down to the bottom of the slot 141a, uncoupling the detent from the outside actuating means.

While we have shown and described certain embodiments of our invention, it is capable of many modifications. Changes, therefore, in the construction and arrangement may be made without departing from the spirit and scope of the invention as set forth in the appended claims.

We claim:

1. In an automobile door latch, in combination, an elongated frame; latching means movably mounted on said frame; a detent movably mounted on said frame and adapted to engage the latching means and block movement thereof in one direction; actuating means for moving said detent out of engagement with the latching means; a handle carrying an operating member; means for mounting said handle on said frame at a point spaced from the latching means; and connecting means mounted on said frame and coupling said operating member to said actuating means.

2. Apparatus of the character claimed in claim 1, wherein said connecting means comprises a bell crank lever pivotally mounted on the frame and having one arm coupled to said operating member and another arm connected to said actuating means.

3. In an automobile door latch, in combination, an elongated frame; latching means movably mounted on said frame; a detent movably mounted on said frame and adapted to engage the latching means and block movement thereof in one direction; actuating means for moving said detent out of engagement with the latching means; a handle carrying an operating member; means for mounting said handle on said frame at a point spaced from the latching means; connecting means mounted on said frame and coupling said operating member to said actuating means; and locking means including a key cylinder mounted on said handle for uncoupling said actuating means form said detent.

4. In an automobile door latch, in combination, an elongated frame; latching means movably mounted on said frame; a detent movably mounted on said frame and adapted to engage the latching means and block movement thereof in one direction; actuating means for moving said detent out of engagement with the latching means, comprising an intermittent link swingable between a coupled position with relation to said detent wherein the detent is moved out of engagement with the latching means upon shifting movement of the intermittent link and an uncoupled position with relation to said detent wherein the detent is out of the path of shifting movement of the intermittent link; means for swinging said intermittent link; an operating handle; a push button assembly mounted in said handle; means for mounting said handle on said frame at a point spaced from the latching means; and connecting means mounted on the frame and coupling said push button assembly to said actuating means.

5. Apparatus of the character claimed in claim 4, wherein said connecting means comprises a bell crank lever pivotally mounted on the frame and having one arm coupled to the push button assembly and another arm connected to said intermittent link, and wherein said intermittent link extends from said detent to a location adjacent the mounting means for the handle.

References Cited in the file of this patent

UNITED STATES PATENTS

| | | |
|---|---|---|
| 2,569,047 | Endter | Sept. 25, 1951 |
| 2,629,618 | Roethel | Feb. 24, 1953 |
| 2,655,025 | Marple | Oct. 13, 1953 |
| 2,706,129 | Craig | Apr. 12, 1955 |

FOREIGN PATENTS

| | | |
|---|---|---|
| 775,213 | Great Britain | May 22, 1957 |